US011093855B1

(12) United States Patent
Fiedler et al.

(10) Patent No.: US 11,093,855 B1
(45) Date of Patent: Aug. 17, 2021

(54) CROWD SOURCED TRAINING OF AN ARTIFICIAL INTELLIGENCE SYSTEM

(71) Applicant: United Services Automobile Association (USAA), San Antonio, TX (US)

(72) Inventors: Kevin K. Fiedler, Boerne, TX (US); Jeffrey William Gallagher, San Antonio, TX (US); Justin Leggett, Bulverde, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 584 days.

(21) Appl. No.: 15/413,671

(22) Filed: Jan. 24, 2017

Related U.S. Application Data

(60) Provisional application No. 62/286,512, filed on Jan. 25, 2016.

(51) Int. Cl.
*G06N 20/00* (2019.01)
(52) U.S. Cl.
CPC .................................. *G06N 20/00* (2019.01)
(58) Field of Classification Search
CPC ....................................................... G06N 20/00
See application file for complete search history.

(56) References Cited

U.S. PATENT DOCUMENTS

| 8,321,220 B1* | 11/2012 | Chotimongkol | G10L 15/063 704/257 |
| 2006/0074831 A1* | 4/2006 | Hyder | G06N 5/02 706/45 |
| 2015/0169336 A1* | 6/2015 | Harper | G10L 15/22 715/706 |
| 2017/0116177 A1* | 4/2017 | Walia | G06F 40/35 |

OTHER PUBLICATIONS

Jafarpour et al., "Filter, Rank, and Transfer the Knowledge: Learning to Chat", 2014, ResearchGate, all pages (Year: 2014).*
Jafarpour et al., "Filter, Rank and Transfer the Knowledge: Learning to Chat", Jul. 2010, Microsoft Research Technical Report MSR-TR-2010-93, all pages (Year: 2010).*
Brew et al., "The Interaction Between Supervised Learning and Crowdsourcing", Feb. 2015, ResearchGate, all pages (Year: 2015).*

* cited by examiner

*Primary Examiner* — Daniel C Puentes
(74) *Attorney, Agent, or Firm* — Fish & Richardson P.C.

(57) ABSTRACT

Methods, systems, and apparatus, including computer programs encoded on computer storage media, for an crowd sourced training of an artificial intelligence system. One of the methods includes generating a training set using the customer communication information. The method includes training an artificial intelligence system using the training set. The method includes extracting at least one conversation pattern using the artificial intelligence system. The method includes the actions of instructing a chat application to process the at least one conversation pattern.

15 Claims, 4 Drawing Sheets

CROWD SOURCED TRAINING OF AN ARTIFICIAL INTELLIGENCE SYSTEM

CROSS-REFERENCE TO RELATED APPLICATION

This application claims priority to U.S. Provisional Patent Application Ser. No. 62/286,512, filed on Jan. 25, 2016, the entirety of which is hereby incorporated by reference into the present application.

BACKGROUND

Artificial intelligence (AI) is the intelligence exhibited by computer system. It is also the name of the academic field of study which studies how to create computers and computer software that are capable of intelligent behavior. A virtual agent is self-service software that automates the process of delivering answers to customer questions posed across a variety of interaction channels. The virtual agent may interact with a customer using, for example, online chat. Virtual agents tend to be highly scripted to address a few specific inquiries.

SUMMARY

This specification describes technologies relating to artificial intelligence.

In general, one innovative aspect of the subject matter described in this specification can be embodied in methods that include the actions of receiving customer communication information, the customer communication information including information about a plurality of communications between human operators and customers. The methods include the actions of generating a training set using the customer communication information. The methods include the actions of training an artificial intelligence system using the training set. The methods include the actions of extracting at least one conversation pattern using the artificial intelligence system. The methods also include the actions of instructing a chat application to process the at least one conversation pattern.

Particular embodiments of the subject matter described in this specification can be implemented so as to realize one or more of the following advantages. Computers can learn to take over more responsibilities from human operators. Computer technology may be more effectively utilized. Customer experience may be improved. Computer performance may be enhanced and improved.

The foregoing and other embodiments can each optionally include one or more of the following features, alone or in combination. Generating a training set using the customer communication information may include generating input-response pairs. The response may represent an action taken by a human operator. Extracting at least one conversation pattern may include determining that the conversation pattern exceeds a predetermined confidence threshold. The methods may include the actions of verifying the at least one conversation pattern prior to instructing the chat application. The communications between the human operators and the customers may include at least one of chat sessions, telephone communications, and e-mail communications.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
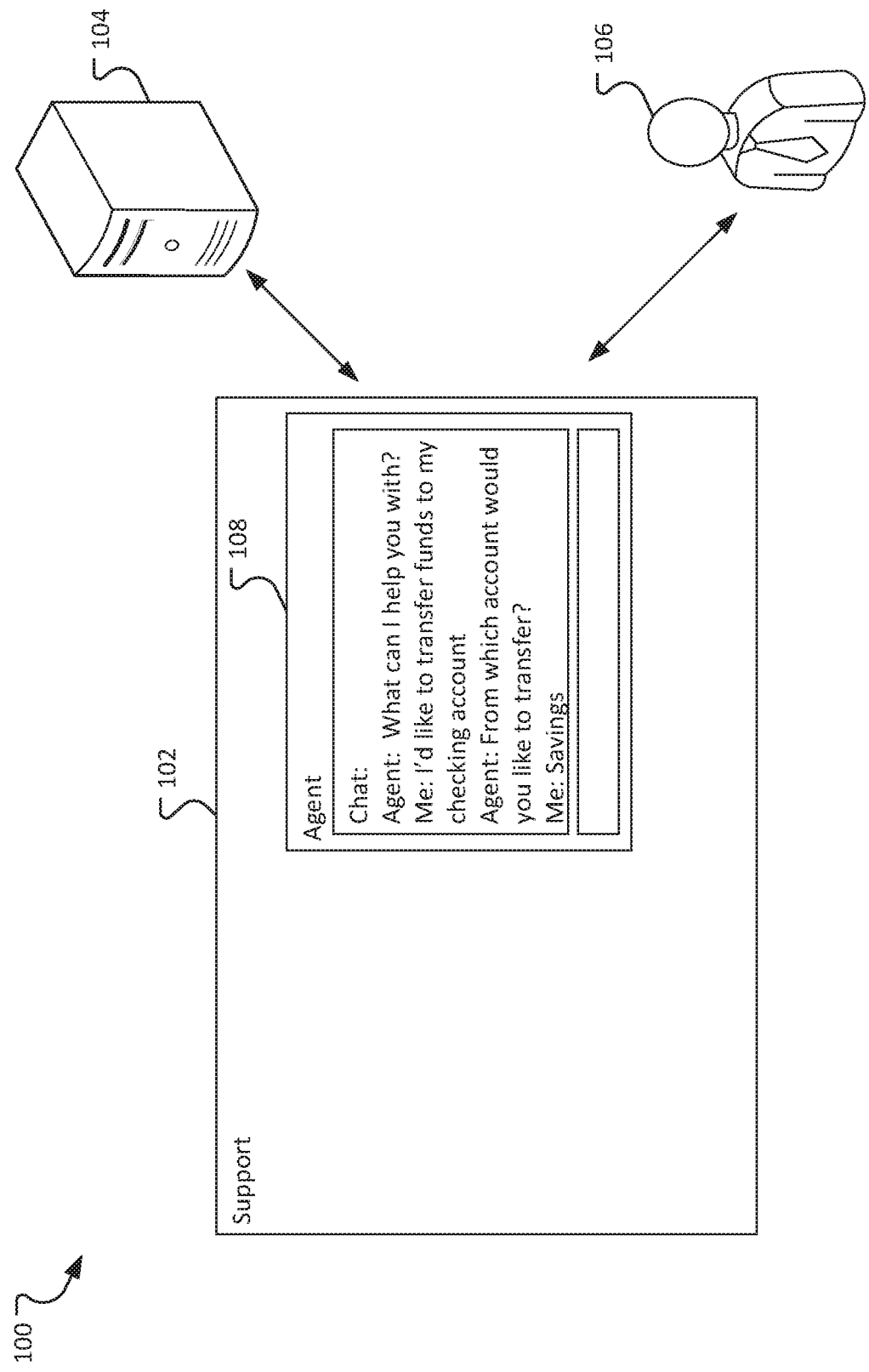
FIG. 1 illustrates a virtual agent environment 100 that passes control of the conversation to a human operator.

FIG. 1 illustrates a virtual agent environment 100 that passes control of the conversation to a human operator. In this virtual agent environment 100, a customer (not shown) can use a "virtual agent" system 104 to assist him in conducting business with an organization. The virtual agent simulates the behavior of a human agent by communicating using natural language. The virtual agent system 104 can receive natural language inputs from a user (e.g., text or speech), interpret the input using natural language processing techniques, then output a natural language response to the user. The virtual agent system is deployed in a variety of settings. In this example, a customer accesses the organization's website 102. The customer can input a question into a graphical "chat" interface 108. The virtual agent system 104 automatically interprets the user's inputs, determines an appropriate answer to the question, and presents that answer to the user via the chat interface.

In conventional systems, the behavior of the virtual agent system 104 depends on a manually programmed decision tree. That is, developers must anticipate a user's inputs, and program specific responses to those inputs. As an example, if the user asks a question regarding his bank account, the virtual agent system can automatically respond only when a developer previously anticipated that particular question, and programmed an appropriate response. In the absence of prior programming or clear matching of the user's question to an anticipated question, the virtual agent system redirects the user's input to a human operator 106 for manual processing. As examples, the human operator 106 can either manually provide guidance to the virtual agent system 104, or manually respond to the user's input. In some implementations, the human operator 106 may interact with the user through the same chat interface 108. The user may or may not be made aware that the communication has transferred from the virtual agent system 104 to the human operator 106.

In order to expand the capabilities of the virtual agent, a virtual agent driven by artificial intelligence system can be trained to respond to a greater and growing variety of user requests. The virtual agent can be trained through crowd sourced, machine learning techniques. These techniques allow a virtual agent to interpret and respond to a customer's inputs, in the absence of manually programmed responses. Thus, fewer customer requests need to be redirected to human operators for interpretation and response, and the efficiency of customer service is improved.

Figure 2:
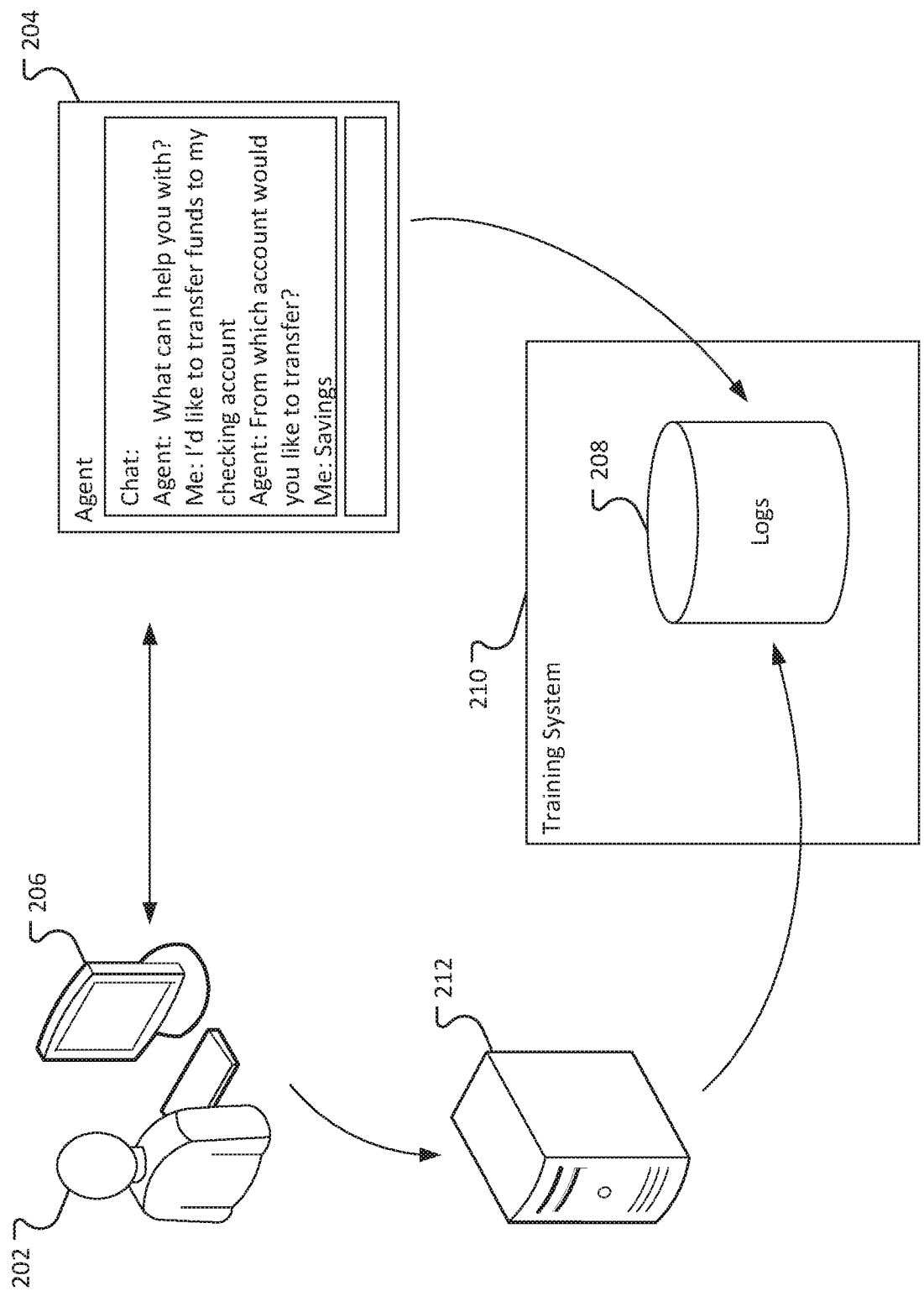
FIG. 2 illustrates an example of crowd sourced training for a virtual agent system.

FIG. 2 illustrates an example of crowd sourced training for a virtual agent system. In some implementations, a training system records the interactions between a customer and a human operator 202 who has intervened or taken over from the virtual agent system, as described above. For example, as the human operator 202 interacts with the customer through the chat interface 204 a record of the chat may be stored in a log data store 208 of a training system 210. Actions taken by the human operator 202 using the human operator's computer system 206 to interact with the organizations system 212 may also be recorded and stored in the log data store.

While this example illustrates records from the chat and the organizations system providing the details of the interactions separately to the log data store, in some implementations, the records of the chat and actions taken by the human operator 202 may be transmitted from the human operator's computer 206 to the log data store 210.

In some implementations, other communications between a human operator and a customer may also be tracked and stored in the log data store 210. For example, a telephone communication between a human operator and a customer may be captured using a text to speech analyzer. E-mail communications and subsequent actions associated with the e-mail may also be captured.

Figure 3:
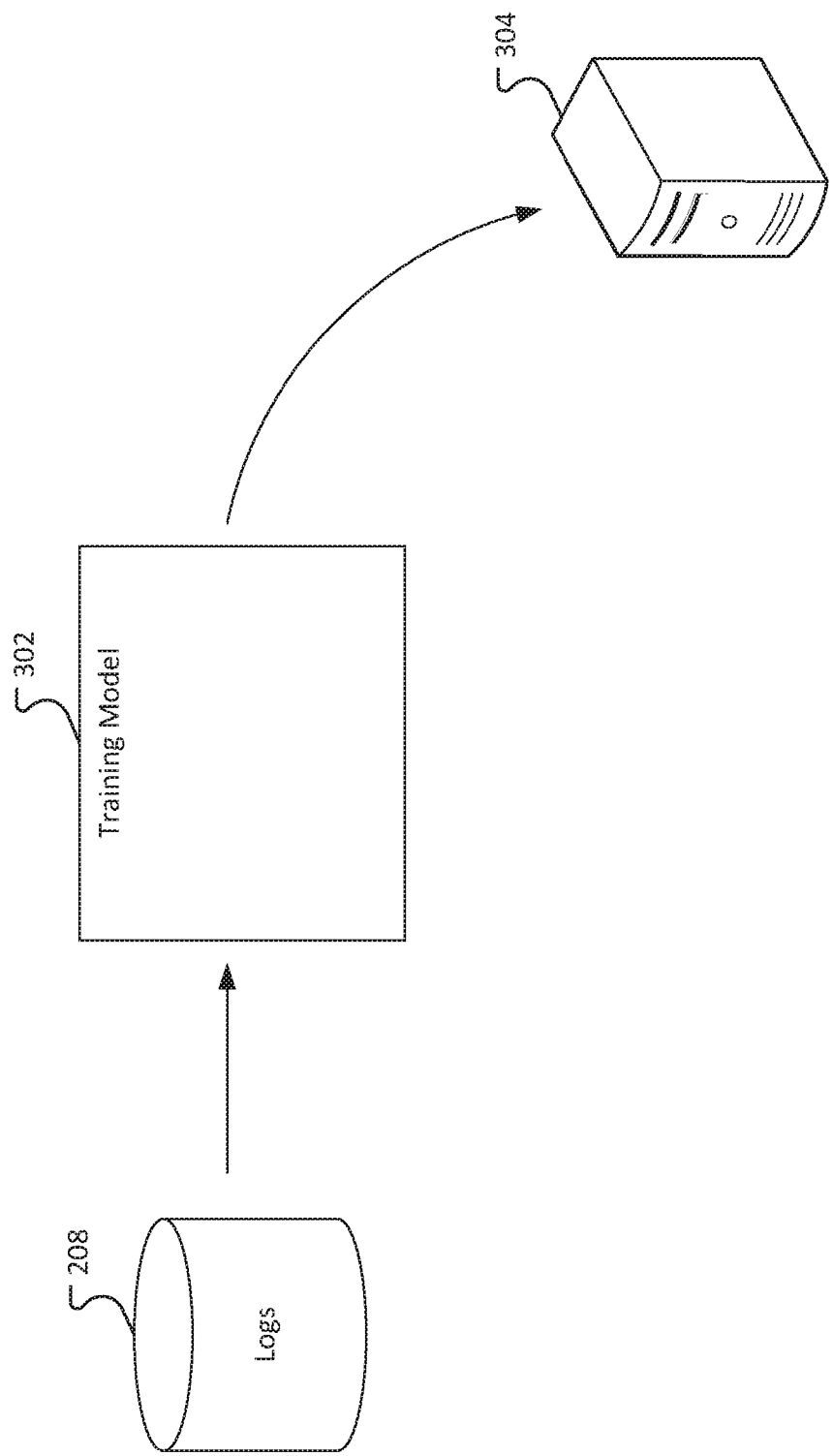
FIG. 3 illustrates training a virtual agent using the records.

FIG. 3 illustrates training a virtual agent using the records. Based on these records 208, the training model 302 identifies patterns in the customer's inputs and corresponding patterns in the human operator's response. Over time, if a particular input and response are repeated several times, the training system identifies that input-response pair as a candidate for automated handling by the virtual agent system. The virtual agent system 304 may be updated using the trained model. Thus, when a customer enters a similar input in the future, the virtual agent system no longer routes that input to a human operator, and instead automatically responds to the customer.

The training system can interpret the interactions between a customer and a human operator using a variety of natural language processing techniques. For example, the training system can parse records of numerous individual interactions, then identify grammatical, syntactical, and/or other linguistic patterns across the interactions. Based on these patterns, the training system can identify common linguistic concepts or themes, and identify correlations between particular input and responses, even despite differences in the precise language used in each individual interaction. In some implementations, these patterns can be used to identify the general or specific intent of a user, and match that intent to an appropriate response.

The training system can determine a set of rules that govern the chat logs and actions taken. In some implementations, the training system can generate confidence metrics indicating the reliability of an input-response pair. For example, if the training system determines, to a high degree of confidence, that a particular question corresponds to a particular response, the training system can associate that question and response together, and assign that pair a relatively high confidence score. However, if the training system is uncertain whether a particular question corresponds to a particular response, the training system can associate that question and response together, but assign that pair a relatively low confidence score. In some implementations, the training system can identify the input-response pairs that exceed a particular confidence score (e.g., indicating that the training system is highly confident regarding the pairing), and apply only those input-response pairs to the virtual agent system. As used herein, an identified input-response pair is referred to as a conversation pattern. Alternatively, the training system can sent the input-response pair to one or more users who may confirm that the training system has appropriate determined an to input-response pair.

In some implementations, the chat logs and actions taken by the human operator may be provided to an unsupervised learning algorithm. In an unsupervised learning algorithm the data is provided without labels. Because the examples given to the learner are unlabeled, there is no error or reward signal to evaluate a potential solution. The learning algorithm determines the structure and relationship within the data.

In some implementations, the chat logs may be provided as input data into a training set and the actions taken by the human operator may be provided to a supervised learning algorithm. In supervised learning algorithms, the machine learning task of inferring a function from labeled training data. The training data can include of a set of training examples. In supervised learning, each example is a pair consisting of inputs and a desired output. A supervised learning algorithm analyzes the training data and produces an inferred function, which can be used for mapping new examples. The algorithm generalizes from the training data to unseen situations. For example, the chat logs may be provided as the input and the actions taken by the human operator may be provided as the output. In some implementations, the chat logs may be subdivided into inputs and outputs. For example, a last computer statement and a user input may be used as a training input, while the next statement by the human operator may be provided as a training output. In some implementations, each statement or action by a human operator may be provided as a training output, and the entire chat conversation up to the point of the statement or action may be provided as the training input.

In some implementations, natural language processing can be performed, at least in part, using an external natural language processor. For example, the training system can obtain records of numerous interactions between customers and human operators, and transmit those records to a natural language processor. The natural language processor parses the records, identifies correlations between particular inputs and responses, and returns identified input-response pairs to the training system. The training system then modifies the behavior of the virtual agent system based on this information. Example natural language processors include Nina from Nuance Communications.

In some implementations, input-response pairs can be manually reviewed by a human user prior to implementation into the "live" virtual agent system. As an example, the training system can identify candidate input-response pairs (e.g., input-response pairs having a sufficiently high confidence score), and present those candidates to a user for review. The user reviews each of the candidates for accuracy and suitability, and selects particular input-response pairs for implementation into the virtual agent system. Thus, users can oversee the training process, such that the virtual agent system does not develop unwanted or unexpected behavior.

Figure 4:
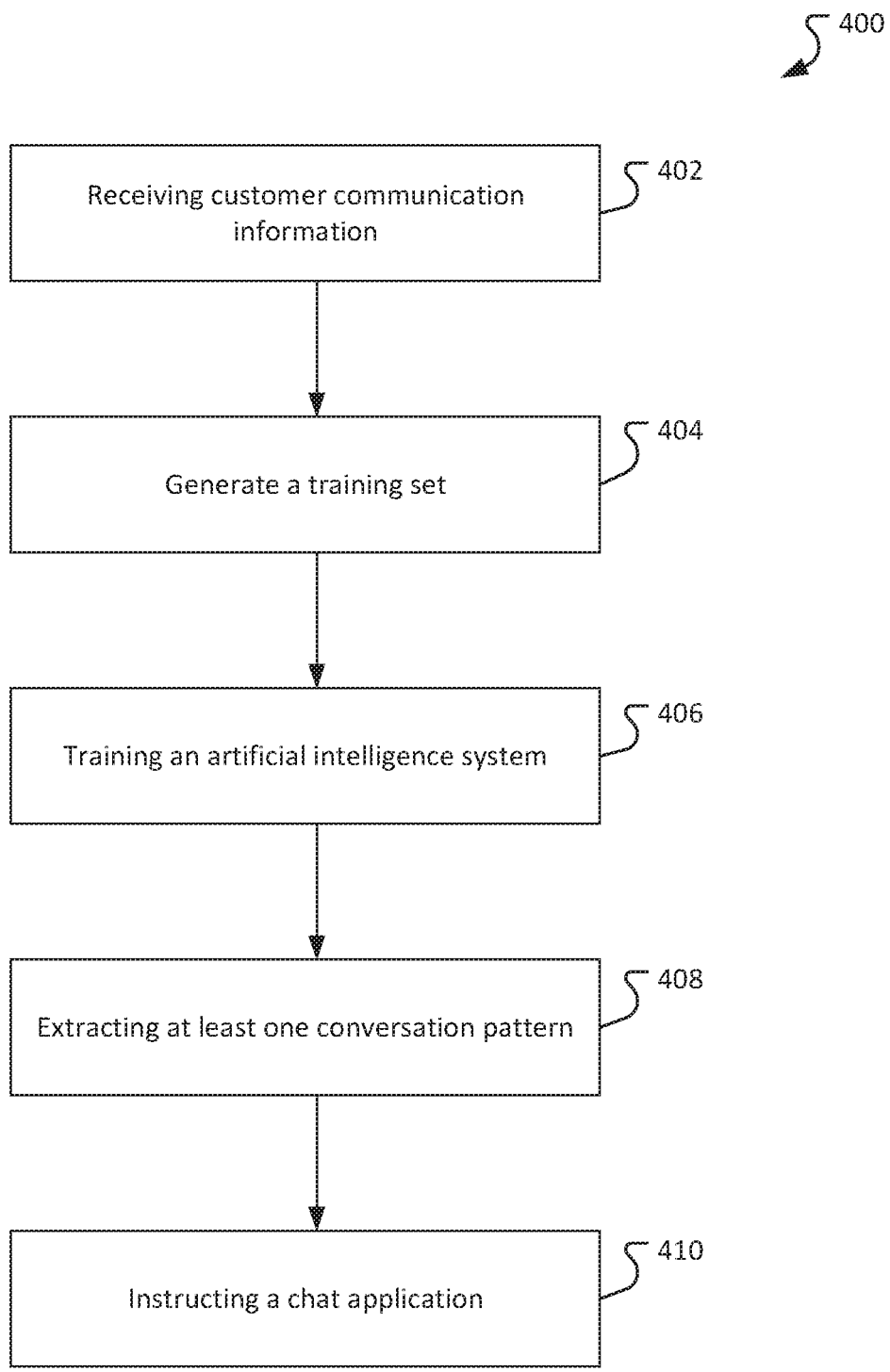
FIG. 4 is a flow chart of an example process for Like reference numbers and designations in the various drawings indicate like elements.

FIG. 4 is a flowchart of an example process 400 for training an artificial intelligence system. The process may be performed by one or more computer systems acting in serial or in parallel.

The process 400 includes receiving 402 customer communication information. Customer communication information may be collected from separate conversations or interactions between a human operator (such as a customer service representative) and a customer. The communications may occur, for example, over the telephone, through a chat window, through e-mail, or through a support services interface.

The process 400 includes generating 404 a training set. The training set may be generating using the captured information about the communications. In some implementations, the communications may be segmented into input-response pairs.

The process 400 includes training 406 an artificial intelligence system. The artificial intelligence system may be trained using supervised or unsupervised learning techniques, as described above.

The process 400 extracts 408 at least one conversation pattern. The conversation pattern may include, for example, actions taken by the human operator in order to satisfy a customer request. In some implementations, extracting at least one conversation pattern, can include assigning a confidence value to different conversation patterns, the confidence value reflective of the confidence the training algorithm assigns to its determinations. The system can select conversation patterns that exceed a predetermined confidence threshold.

The process 400 instructs 410 a chat application to process the at least one conversation pattern. In some implementations, conversation patterns may be vetted by a human operator prior to being integrated into a chat program.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
   obtaining customer communication information, the customer communication information including a plurality of communications between human operators and customers, each of the communications including a one-on-one interaction between a customer and a human operator and each of the communications including a plurality of inputs of the respective customer and a plurality of responses of the respective human operator;
   generating a training data set for a supervised learning system using the customer communication information by:
      identifying a plurality of input-response pairs of the customer communication information based, at least partly, on the plurality of inputs and the plurality of responses, each input-response pair comprising an input of a respective communication from among the plurality of communications and a response of the respective communication;
      determining, for each input response-pair in a first subset of the plurality of input-response pairs, a number of times that the respective input-response pair occurs within the customer communication information;
      assigning, to each of the plurality of input-response pairs, a confidence metric, wherein the confidence metric includes at least one of a score indicating a likelihood that the response of that input-response pair corresponds to the input of that input-response pair or the number of times that the respective input-response pair occurs within the customer communication information; and
      selecting, as the training data set for the supervised learning system, a second subset of input-response pairs of the plurality of input-response pairs that each have a respective confidence metric that exceeds a confidence metric threshold value; and
   training the supervised learning system by applying the input-response pairs from the second subset of input-response pairs as training input to the supervised learning system, wherein only the input of each input response pair of the subset of input-response pairs is applied as input data to the supervised learning system and wherein the response of each input-response pair of the subset of input-response pairs is applied to the supervised learning system as expected output data.

2. The method of claim 1, wherein the plurality of responses represents one or more actions taken by one or more human operators.

3. The method of claim 1, wherein the plurality of communications between the human operators and the customers include at least one of telephone communications and e-mail communications.

4. The method of claim 1, wherein identifying the plurality of input-response pairs comprises: parsing each of the communications using natural language processing techniques to identify linguistic patterns indicating a correlation between at least one of the plurality of inputs in the communication and at least one of the plurality of responses in the communication.

5. The method of claim 4, wherein assigning the confidence metric comprises: determining, for each of the plurality of input-response pairs, a strength of the correlation between the at least one of the plurality of inputs in the communication and the at least one of the plurality of responses in the communication.

6. A system comprising:
   one or more computers and one or more storage devices storing instructions that are operable, when executed by the one or more computers, to cause the one or more computers to perform operations comprising:
   obtaining customer communication information, the customer communication information including a plurality of communications between human operators and customers, each of the communications including a one-on-one interaction between a customer and a human operator and each of the communications including a plurality of inputs of the respective customer and a plurality of responses of the respective human operator;

generating a training data set for a supervised learning system using the customer communication information by:

identifying a plurality of input-response pairs of the customer communication information based, at least partly, on the plurality of inputs and the plurality of responses, each input-response pair comprising an input of a respective communication from among the plurality of communications and a response of the respective communication;

determining, for each input response-pair in a first subset of the plurality of input-response pairs, a number of times that the respective input-response pair occurs within the customer communication information;

assigning, to each of the plurality of input-response pairs, a confidence metric, wherein the confidence metric includes at least one of a score indicating a likelihood that the response of that input-response pair corresponds to the input of that input-response pair or the number of times that the respective input-response pair occurs within the customer communication information; and selecting, as the training data set for the supervised learning system, a second subset of input-response pairs of the plurality of input-response pairs that each have a respective confidence metric that exceeds a confidence metric threshold value; and training the supervised learning system by applying the input-response pairs from the second subset of input-response pairs as training input to the supervised learning system, wherein only the input of each input response pair of the subset of input-response pairs is applied as input data to the supervised learning system and wherein the response of each input-response pair of the subset of input-response pairs is applied to the supervised learning system as expected output data.

7. The system of claim 6, wherein the plurality of responses represents one or more actions taken by one or more human operators.

8. The system of claim 6, wherein the plurality of communications between the human operators and the customers include at least one of telephone communications and e-mail communications.

9. The system of claim 6, wherein identifying the plurality of input-response pairs comprises: parsing each of the communications using natural language processing techniques to identify linguistic patterns indicating a correlation between at least one of the plurality of inputs in the communication and at least one of the plurality of responses in the communication.

10. The system of claim 9, wherein assigning the confidence metric comprises: determining, for each of the plurality of input-response pairs, a strength of the correlation between the at least one of the plurality of inputs in the communication and the at least one of the plurality of responses in the communication.

11. A non-transitory computer storage medium encoded with computer program instructions that when executed by one or more computers cause the one or more computers to perform operations comprising:

obtaining customer communication information, the customer communication information including a plurality of communications between human operators and customers, each of the communications including a one-on-one interaction between a customer and a human operator and each of the communications including a plurality of inputs of the respective customer and a plurality of responses of the respective human operator;

generating a training data set for a supervised learning system using the customer communication information by:

identifying a plurality of input-response pairs of the customer communication information based, at least partly, on the plurality of inputs and the plurality of responses, each input-response pair comprising an input of a respective communication from among the plurality of communications and a response of the respective communication;

determining, for each input response-pair in a first subset of the plurality of input-response pairs, a number of times that the respective input-response pair occurs within the customer communication information;

assigning, to each of the plurality of input-response pairs, a confidence metric, wherein the confidence metric includes at least one of a score indicating a likelihood that the response of that input-response pair corresponds to the input of that input-response pair or the number of times that the respective input-response pair occurs within the customer communication information; and selecting, as the training data set for the supervised learning system, a second subset of input-response pairs of the plurality of input-response pairs that each have a respective confidence metric that exceeds a confidence metric threshold value; and training the supervised learning system by applying the input-response pairs from the second subset of input-response pairs as training input to the supervised learning system, wherein only the input of each input response pair of the subset of input-response pairs is applied as input data to the supervised learning system and wherein the response of each input-response pair of the subset of input-response pairs is applied to the supervised learning system as expected output data.

12. The medium of claim 11, wherein the plurality of responses represents one or more actions taken by one or more human operators.

13. The medium of claim 11, wherein the plurality of communications between the human operators and the customers include at least one of telephone communications and e-mail communications.

14. The medium of claim 11, wherein identifying the plurality of input-response pairs comprises parsing each of the communications using natural language processing techniques to identify linguistic patterns indicating a correlation between at least one of the plurality of inputs in the communication and at least one of the plurality of responses in the communication.

15. The medium of claim 14, wherein assigning the confidence metric comprises determining, for each of the plurality of input-response pairs, a strength of the correlation between the at least one of the plurality of inputs in the communication and the at least one of the plurality of responses in the communication.

* * * * *